United States Patent Office 3,732,222
Patented May 8, 1973

---

3,732,222
CYCLOALKYL AMINOTHIOCARBONYL DISULFIDES
Eiichi Morita, Copley, Ohio, assignor to Monsanto Company, St. Louis, Mo.
No Drawing. Filed Sept. 28, 1970, Ser. No. 76,277
Int. Cl. C07d 87/46
U.S. Cl. 260—247.1    6 Claims

ABSTRACT OF THE DISCLOSURE

Cycloalkyl aminothiocarbonyl disulfides of the formula

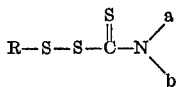

wherein

is an amino radical in which $a$ and $b$ independently are alkyl, cycloalkyl, or aralkyl or together with the nitrogen atom form a heterocycle, and R is cycloalkyl are prepared by reacting carbon disulfide with the appropriate sulfenamide. The new disulfides are excellent vulcanization accelerators.

---

This invention relates to methods of accelerating the vulcanization of vulcanizable elastomers. More particularly, the invention relates to cycloalkyl aminothiocarbonyl disulfides which possess special properties and to methods for preparing them.

BACKGROUND OF THE INVENTION

Known methods for producing aminothiocarbonyl disulfides comprise the reaction of an alkali metal salt of a dithiocarbamic acid with (1) sulfenyl halide, Teppema U.S. 2,024,613, Dec. 17, 1935, and Himel and Edmonds U.S. 2,792,394, May 14, 1957 or (2) sulfenylthiocyanates, Hunt U.S. 2,390,713, Dec. 11, 1945. The principle uses for aminothiocarbonyl disulfides are as vulcanization accelerators and as biologically active agents. For example, see Svetlik U.S. 2,826,563, Mar. 11, 1958; Ghosh U.S. 3,232,974, Feb. 1, 1966 and Goodhue U.S. 2,941,879, June 21, 1960.

SUMMARY OF THE INVENTION

In accordance with this invention, cycloalkyl aminothiocarbonyl disulfides are prepared which have the formula

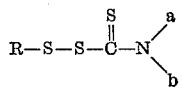

wherein

is a secondary amino radical in which $a$ and $b$ independently are alkyl, cycloalkyl or aralkyl or together with the nitrogen atom form a heterocycle and R is cycloalkyl by reacting carbon disulfide with

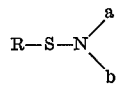

Branched and unbranched alkyl radicals of 1 to 12 carbon atoms are suitable for $a$ and $b$. Lower alkyl radicals of 1 to 5 carbon atoms are preferred. Examples of alkyl radicals are methyl, ethyl, propyl, isopropyl, n-butyl, sec-butyl, iso-butyl, tert-butyl, amyl, hexyl, octyl, decyl and dodecyl.

Cycloalkyl radicals of 5 to 12 carbon atoms are suitable for $a$, $b$ or R in the practice of this invention with cycloalkyl radicals of 5 to 8 carbon atoms being a preferred subgroup thereof. Examples of cycloalkyl radicals are cyclopentyl, cyclohexyl, cyclooctyl, cyclodecyl and cyclododecyl. Where one or both of $a$ and $b$ is aralkyl, radicals of 7 to 10 carbon atoms are preferred, examples of which are benzyl, phenethyl and alpha,alpha-dimethyl benzyl.

Where $a$ and $b$ together with the nitrogen atom to which they are joined form a heterocycle, it is preferred that it contain at least 4 carbon atoms. By heterocycle in the general formula it is meant that

is the radical formed by removal of a hydrogen atom from a heterocyclic amine. The heterocycle may contain atoms other than carbon and nitrogen in the heterocyclic ring and may contain lower alkyl substituents. Examples of heterocycles are pyrrolidinyl, 2,5-dimethyl pyrrolidinyl, morpholino, cis and trans 2,6-dimethyl morpholino, thiomorpholino, piperidino, pipecolino, 3 - azabicyclo-[3.2.2]non-3-yl, hexahydro(1H)azepin-1-yl, hexahydro-(2H)azocin-1 - yl and octahydro(1H)azonin - 1 - yl. Preferred heterocycles are monocyclic six membered rings. The heterocycle may be a diamine, for example, when the heterocycle radical of the general formula

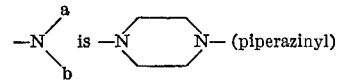

compounds of the formula

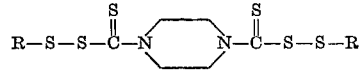

are obtained.

The method for preparing the disulfides of this invention comprises reacting carbon disulfide with a sulfenamide. The carbon disulfide molecule inserts between the S—N bond of the sulfenamide forming an aminothiocarbonyl disulfide. They may be prepared in conventional manner by reacting a cycloalkyl sulfenyl halide with an alkali metal or tert-amine salt of a dithiocarbamic acid but one advantage of the new method is the elimination of the use of sulfenyl halides which are difficult to prepare and handle. The sulfenamide intermediate is conveniently prepared by the known procedures.

Cycloalkyl aminothiocarbonyl disulfides are excellent accelerators for the vulcanization of rubber. They cure faster yet have scorch properties comparable to delayed-action sulfenamide accelerators. These and other advantages of this invention shall become apparent as the description of the invention proceeds.

DESCRIPTION OF THE PREFERRED EMBODIMENTS

To form the aminothiocarbonyl disulfides by reacting carbon disulfide with the appropriate sulfenamide, the reaction may be carried out between 0–100° C. with or without an inert solvent. Good yields of disulfide are obtained by mixing carbon disulfide and sulfenamide at room temperature for 24 hours but the reaction time may be shortened by heating the mixture. Suitable solvents are ethyl ether, methanol, ethanol, chlorofrom, benzene, heptane, hexane and ethyl acetate. In the absence of solvent, excess carbon disulfide may be used as the reaction medium. Sulfenamides suitable for the practice of this invention have the formula

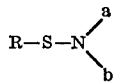

wherein $a$, $b$ and

are the same as previously described.

The use of equal molar quantities of carbon disulfide and sulfenamide reactants are recommended, although the disulfides may be prepared with excess of either reactant. An excess of carbon disulfide is preferred to assure complete conversion of the sulfenamide. Of course, in the case of bis-sulfenamides, two moles of carbon disulfide for each mole of sulfenamide is reuired for complete conversion to bis(disulfide).

Example 1.—Cyclohexyl piperidinothiocarbonyl disulfide

To a stirred solution of N-(cyclohexylthio)piperidine 39.9 grams (0.2 mole) in 100 ml. of methanol is added with stirring in one portion 19 grams (0.25 mole) of carbon disulfide. The temperature of the reaction mixture rises from 23° to 45° C. in ten minutes. The stirred mixture is heated at reflux for 4½ hours and then cooled to 0° C. and held for 1 hour between 0° to 10° C. The product is recovered by filtration and air dried at room temperature. 52 grams (94.4% yield) of product is recovered. The cyclohexyl piperidinothiocarbonyl disulfide recrystallized from heptane melts at 75–76° C. Analysis gives 52.49% carbon, 7.75% hydrogen, 5.14% nitrogen and 35.10% sulfur compared to 52.31% carbon, 7.68% hydrogen, 5.08% nitrogen and 34.92% sulfur calculated for $C_{12}H_{21}NS_3$. The molecular weight determined in benzene is 285.

Example 2.—Cyclohexyl morpholinothiocarbonyl disulfide

The procedure of Example 1 is followed except 19.0 grams of carbon disulfide is reacted with 40.3 grams of N-(cyclohexylthio)morpholine. 49 grams (88.3% yield) of disulfide is obtained. Twice recrystallized from alcohol, the cyclohexyl morpholinothiocarbonyl disulfide melts at 59.0–59.5° C. Analysis gives 47.43% carbon, 6.87% hydrogen, 5.07% nitrogen, 6.10% oxygen and 34.51% sulfur as compared to 47.61% carbon, 6.90% hydrogen, 5.05% nitrogen, 5.77% oxygen and 34.67% sulfur calculated for $C_{11}H_{19}NOS_3$. The molecular weight determined in dimethylformamide is 272.

Example 3.—Cyclohexyl 4-pipecolinethiocarbonyl disulfide

The disulfide is prepared by the procedure of Example 1 by adding 0.14 mole of carbon disulfide to 0.11 mole of N-(cyclohexylthio)pipecoline. 24 grams (75.4% yield) of disulfide is obtained. Recrystallized from heptane, the product melts at 44° C. Analysis gives 54.13% carbon, 7.89% hydrogen, 4.82% nitrogen and 33.38% sulfur compared to 53.93% carbon, 8.00% hydrogen, 4.84% nitrogen and 33.23% sulfur calculated for $C_{13}H_{23}NS_3$.

Example 4.—Cyclohexyl 3-azabicyclo[3.2.2]non-3-ylthiocarbonyl disulfide 25 grams (79.2% yield) of disulfide is obtained by the procedure of Example 1 by reacting 9.5 grams of carbon disulfide with 24 grams of 3-(cyclohexylthio)-3-azabicyclo[3.2.2]nonane. Recrystallized from heptane, the disulfide melts at 104–105° C. Analysis gives 56.92% carbon, 7.87% hydrogen, 4.34% nitrogen and 30.41% sulfur compared to 57.09% carbon, 7.99% hydrogen, 4.44% nitrogen and 30.48% sulfur calculated for $C_{15}H_{25}NS_3$.

Example 5.—Cyclohexyl 1-pyrrolidinylthiocarbonyl disulfide 19 grams of carbon disulfide is reacted with 37.0 grams of 1-(cyclohexylthio)pyrrolidine to give 40 grams (76.5% yield) of disulfide which melts at 38–39° C. when recrystallized from heptane. Analysis gives 50.39% carbon, 7.39% hydrogen, 5.48% nitrogen and 36.99% sulfur compared to 50.53% carbon, 7.32% hydrogen, 5.36% nitrogen and 36.79% sulfur calculated for $C_{11}H_{19}NS_3$.

Example 6.—Cyclohexyl 2,6-dimethylmorpholinothiocarbonyl disulfide 49 grams (80.2% yield) of disulfide is obtained by reacting 19 grams of carbon disulfide with 45.9 grams of 4-(cyclohexylthio)-2,6-dimethylmorpholine. The disulfide melts after recrystallization from heptane at 64–65° C. Analysis gives 51.27% carbon, 7.64% hydrogen, 4.43% nitrogen, 5.23% oxygen and 31.33% sulfur compared to 51.10% carbon, 7.59% hydrogen, 4.58% nitrogen, 5.24% oxygen and 31.49% sulfur calculated for $C_{13}H_{23}NOS_3$.

Example 7.—Cyclohexyl hexahydro(1H)azepin-1-ylthiocarbonyl disulfide

Carbon disulfide, 20.8 grams (0.3 mole), is added to a stirred solution of 49.1 grams (0.23 mole) of 1-(cyclohexylthio)hexahydro(1H)azepine in 100 ml. of methanol. Within 3 minutes of addition, the reaction temperature rises from 27° to 48° C. The reaction mixture is heated at reflux between 55° and 61° C. for 4 hours and then cooled to room temperature and held with stirring for 24 hours. The methanol and the excess carbon disulfide is removed in vacuo at a maximum temperature of 80–90° C. at 1–2 mm. pressure. 59 grams of a viscous liquid (88.6% yield) is obtained. Refractive Index is $$N_D{}^{25}=1.6075$$

Analysis gives 8.14% hydrogen and 4.43% nitrogen compared to 8.00% hydrogen and 4.84% nitrogen calculated for $C_{13}H_{23}NS_3$.

Example 8.—Cyclohexyl N,N-diethylthiocarbamyl disulfide

To a solution containing 37.9 grams (0.2 mole) of sodium N,N-diethyldithiocarbamate hydrate in 800 ml. of ethyl ether is added dropwise 0.2 mole of cyclohexylsulfenyl chloride in 105 ml. of hexane in 20 minutes at 0–10° C. The reaction mixture is stirred at 25–30° C. for 24 hours after which there is added 200 ml. of water and the mixture stirred for an additional 15 minutes. The ether layer is separated, washed with water until neutral, and dried over sodium sulfate. The ether-hexane solvent is removed in vacuo at a maximum temperature of 80° C. at 1–2 mm. pressure. The residue is filtered to remove a small amount of solid material. 44 grams (83.5% yield) of a viscous liquid is obtained having an index of refraction of $N_D{}^{25}=1.5938$. Analysis gives 49.90% carbon, 8.15% hydrogen, 5.13% nitrogen and 36.27% sulfur compared to 50.14% carbon, 8.03% hydrogen, 5.32% nitrogen and 36.51% sulfur calculated for $C_{11}H_{21}NS_3$.

Example 9.—Cyclohexyl hexahydro(2H)azocin-1-ylthiocarbonyl disulfide

The disulfide is prepared by the procedure of Example 8 by reacting cyclohexyl sulfenyl chloride with the dithiocarbamic acid derived from heptamethyleneamine, carbon disulfide and triethylamine. 61 grams (80.4% yield) of a viscous liquid is obtained. Analysis gives 4.62% nitrogen and 31.85% sulfur compared to 4.61% nitrogen and 31.69% sulfur calculated for $C_{14}H_{25}NS_3$.

Example 10.—Cyclooctyl 3-azabicyclo[3.2.2]non-3-ylthiocarbonyl disulfide 8.4 grams (0.11 mole) of carbon disulfide is reacted with 23 grams (0.086 mole) of 3-(cyclooctylthio)-3-azabicyclo[3.2.2]nonane in 75 ml. of methanol by the procedure of Example 1. 18 grams (60.9% yield) of the desired disulfide is obtained which melts at 71–72° C. when recrystallized from heptane. Analysis gives 4.02% nitrogen and 27.96% sulfur compared to 4.08% nitrogen and 28.00% sulfur calculated for $C_{17}H_{29}NS_3$.

Example 11.—Cyclododecyl 3-azabicyclo[3.2.2]non-3-ylthiocarbonyl disulfide 3.8 grams (0.05 mole) of carbon disulfide is reacted with 11.3 grams (0.0349 mole) of 3-(cyclododecylthio)-3-azabicyrlo[3.2.2]nonane in 50 ml. of methanol by following the procedure of Example 1. 10 grams (71.7% yield) of the desired disulfide is obtained which when recrystallized from heptane melts at 119–120° C. Analysis gives 3.32% nitrogen and 23.96% sulfur compared to 3.50% nitrogen and 24.07% sulfur calculated for $C_{21}H_{37}NS_3$.

Example 12.—Cyclohexyl N,N-dimethylthiocarbamyl disulfide

To a stirred slurry containing 89.6 grams (0.5 mole) of sodium N,N-dimethyldithiocarbamate hydrate in 600 ml. of ethyl ether there is added dropwise 0.5 mole of cyclohexylsulfenyl chloride in 230 ml. of hexane in one hour at 0–10° C. The reaction mixture is stirred at 25–30° C. for 24 hours after which there is added 300 ml. of water and the mixture stirred for an additional 15 minutes. The ether layer is separated, washed with water until neutral and dried over sodium sulfate. The ether-hexane solvent is removed in vacuo. 97 grams (84.2% yield) of a low melting solid is obtained which, upon recrystallization from 100 ml. of heptane and 25 ml. of isopropyl alcohol, gave 44 grams of the desired disulfide, melting point 62–62.5° C.

The accelerators of this invention are applicable to rubber stocks containing sulfur or sulfur-containing vulcanizing agents. For the purposes of this invention sulfur vulcanizing agent means elemental sulfur or a sulfur containing vulcanizing agent, for example, an amine disulfide such as 4,4'-dithiomorpholine or a polymeric polysulfide. The accelerators of this invention may also be used in comjunction with other accelerators, for example the aromatic thiazole accelerators which include benzothiazole-2-monocyclohexyl sulfenamide, 2-mercaptobenzothiazole, 2,2'-dithiobisbenzothiazole, N-terbutyl 2-benzothiazole sulfenamide, 2-benzothiazolediethyldithiocarbamate and 2-morpholinothiobenzothiazole. The accelerators may also be used with amine salts of mercaptobenzothiazole, for example the tert-butyl amine salt of mercaptobenzothiazole or salts of morpholine and 2,6-dimethylmorpholine. The accelerators are also effective with stocks containing other types of accelerators, for example the tetramethylthiuram disulfide, tetramethylthiuram monosulfide, aldehyde amine condensation products, thiocarbamyl sulfenamides, thioureas, metal dithiocarbamates, alkyl dithiocarbamates, hexamethylenetetramine, xanthates, and guanidine derivatives may also be used. The accelerators are also effective when used in combination with prevulcanization inhibitors, for example N-(cyclohexylthio)phthalimide or cyclohexylthiomorpholine. The rubber mixes of this invention may also contain antidegradants, for example N-1,3-dimethylbutyl-N-phenyl-p-phenylenediamine, N,N' - bis - 1,4-dimethylpentyl-p-phenylenediamine and other phenylenediamines.

The accelerators of this invention give improved results in rubber stocks containing natural rubber and synthetic rubbers or mixtures thereof. Synthetic rubbers which may be used in the process of this invention include cis-4-polybutadiene, butyl rubber, ethylene propylene terpolymers commonly called EPDM, polymers of 1,3-butadiene, for example 1,3-butadiene itself and of isoprene, copolymers of 1,3-butadiene with other monomers, for example styrene, acrylonitrile, isobutylene and methylmethacrylate. Other types of elastomers other than diene rubbers just mentioned which are improved by the accelerators of this invention are any of the sulfur vulcanizable elastomers which class includes chloroprene rubber and sulfur vulcanizable urethane rubber. Diene rubbers are preferred and elemental sulfur is the preferred vulcanizing agent.

The quantity of the accelerator varies in accordance to the application to which the vulcanizable composition is directed. However, usually the quantities are the same as commonly used for other accelerators. Normally 0.5 to 5 parts accelerator per 100 parts elastomer is adequate. However, in certain applications, particularly when used in conjunction with other accelerators, smaller amounts will be sufficient.

The cure characteristics of the stocks are determined at the indicated temperature of a Monsanto Oscillating Disk Rheometer. The time, $t_2$, required for a rise of two Rheometer units above the minimum reading and the time, $t_{90}$, required to obtained 90% of the Rheometer maximum torque is recorded. The differences of the two times, $t_{90}–t_2$, is a measure of the cure rate of the stocks. The Rheometer maximum torque is a measure of the state of cure or the amount of crosslinking which has taken place during vulcanization and is related to the modulus of the vulcanizate. The time required to achieve optimum cure is determined from the Rheometer data and vulcanizates are prepared by heating stocks in a press for the indicated time. The scorch properties of the stocks are determined by a Mooney Plastometer and the time, $t_5$, in minutes for the Mooney reading to rise five points above the minimum viscosity is recorded. Longer times on the Mooney scorch test indicate greater processing safety.

To illustrate the accelerator activity of the compounds of this invention, a natural rubber masterbatch and styrene-butadiene rubber masterbatch are prepared of the following composition. All parts are by weight.

| | Natural rubber masterbatch | Styrene-butadiene masterbatch |
|---|---|---|
| Natural rubber | 100.0 | |
| Oil-extended SBR | | 137.5 |
| Furnace carbon black | 45.0 | 65.0 |
| Zinc oxide | 3.0 | 3.0 |
| Stearic acid | 2.0 | 1.0 |
| Hydrocarbon softener | 5.0 | 1.5 |
| Total parts | 155.0 | 208.0 |

Vulcanizable stocks are prepared by incorporating into 155 parts of the natural rubber masterbatch 2 parts sulfur, 2 parts of a p-phenylenediamine antidegradant and 0.5 part accelerator, and into 208 parts of the styrene-butadiene masterbatch 2 parts sulfur, 2 parts of a p-phenylenediamine antidegradant and 1.0 part accelerator. The accelerators in each stock tested are as follows:

Stock number: Accelerator
1 N-tert-butyl-2-benzothiazolesulfenamide
2 Cyclohexyl piperidinothiocarbonyl disulfide
3 Cyclohexyl morpholinothiocarbonyl disulfide
4 Cyclohexyl 4-pipecolinethiocarbonyl disulfide
5 Cyclohexyl 3-azabicyclo[3.2.2]non-3-ylthiocarbonyl disulfide
6 Cyclohexyl pyrrolidinylthiocarbonyl disulfide
7 Cyclohexyl 2,6-dimethylmorpholinothiocarbonyl disulfide
8 Cyclohexyl hexahydro(1H)azepin-1-ylthiocarbonyl disulfide
9 Cyclohexyl N,N-diethylthiocarbamyl disulfide
10 Cyclohexyl hexahydro(2H)-azocin-1-ylthiocarbonyl disulfide
11 Cyclooctyl 3-azabicyclo[3.2.2]non-3-ylthiocarbonyl disulfide
12 Cyclododecyl 3-azabicyclo[3.2.2]non-3-ylthiobonyl disulfide The stocks are evaluated as previously described.

STYRENE-BUTADIENE RUBBER STOCKS

| Stock | 1 | 2 | 3 | 4 | 5 | 6 | 7 | 8 | 9 | 10 | 11 | 12 |
|---|---|---|---|---|---|---|---|---|---|---|---|---|
| Mooney data at 135° C.: $t_5$ | 20.6 | 22.5 | 21.3 | 24.3 | 25.5 | 17.8 | 25.4 | 16.7 | 18.4 | 18.9 | 24.6 | 25.4 |
| Rheometer data at 153° C.: | | | | | | | | | | | | |
| $t_2$ | 8.7 | 8.2 | 7.9 | 8.5 | 8.8 | 7.2 | 8.7 | 7.0 | 7.2 | 7.6 | 9.2 | 9.2 |
| $t_{90}-t_2$ | 12.2 | 7.1 | 8.0 | 8.5 | 13.4 | 10.3 | 8.9 | 11.8 | 8.6 | 13.5 | 13.3 | 13.8 |
| Maximum torque (lbs.) | 57.3 | 53.3 | 51.7 | 52.6 | 55.0 | 60.7 | 50.2 | 54.8 | 54.2 | 54.8 | 54.0 | 52.8 |

NATURAL RUBBER STOCKS

| Stock | 1 | 2 | 3 | 4 | 5 | 6 | 7 | 8 | 9 | 10 | 11 | 12 |
|---|---|---|---|---|---|---|---|---|---|---|---|---|
| Mooney data at 121° C.: $t_5$ | 30.6 | 28.1 | 30.8 | 30.6 | 31.9 | 17.4 | 34.9 | 21.7 | 22.9 | 22.9 | 33.0 | 33.2 |
| Rheometer data at 144° C.: | | | | | | | | | | | | |
| $t_2$ | 7.6 | 7.3 | 7.4 | 7.5 | 7.5 | 5.4 | 7.8 | 6.1 | 6.3 | 6.3 | 7.9 | 8.2 |
| $t_{90}-t_2$ | 12.4 | 7.5 | 6.1 | 7.9 | 7.0 | 4.3 | 6.0 | 7.1 | 6.9 | 7.2 | 7.6 | 8.5 |
| Maximum torque (lbs.) | 58.6 | 54.3 | 48.0 | 53.1 | 50.1 | 56.3 | 50.0 | 52.2 | 53.1 | 49.8 | 48.9 | 48.0 |

Although the invention has been illustrated by typical examples, it is not limited thereto. Changes and modifications of the examples of the invention herein chosen for purposes of disclosure can be made which do not constitute departure from the spirit and scope of the invention.

The embodiments of the invention in which an exclusive property or privilege is claimed are defined as follows:

1. A process for preparing cycloalkyl aminothiocarbonyl disulfides which comprises reacting carbon disulfide with a sulfenamide

to produce a compound of the formula

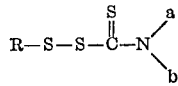

wherein

is an amino radical in which $a$ and $b$ together with the nitrogen atom form a heterocycle of 4 to 8 carbon atoms and R is cycloalkyl of 5–12 carbon atoms.

2. A process according to claim 1 wherein the heterocycle is a monocyclic six membered ring.

3. A process according to claim 2 wherein

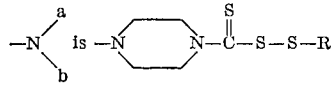

4. A process according to claim 2 wherein R is cyclohexyl.

5. A process according to claim 4 wherein the amino radical is selected from the group consisting of piperidino, lower alkyl piperidino, morpholino and di(lower alkyl) morpholino.

6. A process according to claim 5 wherein the amino radical is morpholino.

References Cited

Dunbar et al.: J. Org. Chem., vol. 35, pp. 279–81 (January 1970).

ALEX MAZEL, Primary Examiner

J. TOVAR, Assistant Examiner

U.S. Cl. X.R.

260—239 B, 239 BA, 239 R, 243 B, 268 R, 293.65, 84.3, 791, 795, 326.83